United States Patent
Stoessel et al.

(10) Patent No.: US 12,152,583 B2
(45) Date of Patent: Nov. 26, 2024

(54) LIQUID PUMP, IN PARTICULAR FOR PROVIDING A SUPPLY TO A TRANSMISSION OF AN ELECTRIC OR HYBRID DRIVE MODULE OF A MOTOR VEHICLE

(71) Applicant: FTE AUTOMOTIVE GmbH, Ebern (DE)

(72) Inventors: Roland Stoessel, Ebern (DE); Christian Voigt, Ebern (DE); Kevin Heider, Ebern (DE); Philip Bahr, Ebern (DE); Steffen Woehner, Ebern (DE); Stefan Moench, Ebern (DE); Markus Dirauf, Ebern (DE); Anton Sauter, Ebern (DE)

(73) Assignee: FTE AUTOMOTIVE GmbH, Ebern (DE)

(*) Notice: Subject to any disclaimer, the term of this patent is extended or adjusted under 35 U.S.C. 154(b) by 535 days.

(21) Appl. No.: 17/196,098

(22) Filed: Mar. 9, 2021

(65) Prior Publication Data
US 2021/0285455 A1    Sep. 16, 2021

(30) Foreign Application Priority Data
Mar. 12, 2020 (DE) ............ 10 2020 106 849.2

(51) Int. Cl.
*F04D 27/00* (2006.01)
*F04B 49/06* (2006.01)
(Continued)

(52) U.S. Cl.
CPC .......... *F04C 15/0003* (2013.01); *F04B 49/06* (2013.01); *F04C 14/28* (2013.01);
(Continued)

(58) Field of Classification Search
CPC .. F04C 14/28; F04C 15/0003; F04C 2240/30; F04B 17/03; F04B 49/06; F04B 2205/11;
(Continued)

(56) References Cited

U.S. PATENT DOCUMENTS 6,134,771 A * 10/2000 Nakamura ........... H01C 1/1406
338/276
6,437,679 B1 * 8/2002 Roques .................... G01K 7/22
374/208
(Continued)

FOREIGN PATENT DOCUMENTS

CN      106415017 A    2/2017
DE      4435511 C1 *   2/1996  ............. F04D 13/06
(Continued)

OTHER PUBLICATIONS

DE102012105534A_MT; English translation of DE-102012105534-A1 (Year: 2014).*
(Continued)

*Primary Examiner* — Dominick L Plakkoottam
*Assistant Examiner* — Charles W Nichols
(74) *Attorney, Agent, or Firm* — Oblon, McClelland, Maier & Neustadt, L.L.P.

(57) ABSTRACT

A liquid pump, in particular for providing a supply to a transmission of an electric or hybrid drive module of a motor vehicle, having a pump housing wherein a pump chamber and a pump rotor are arranged, wherein the pump chamber is connected to an outlet channel to which a temperature sensor is assigned, wherein the temperature sensor has a lead frame and an SMD sensor element.

10 Claims, 5 Drawing Sheets

(51) Int. Cl.
    *F04C 14/28*    (2006.01)
    *F04C 15/00*    (2006.01)
    *F04D 29/18*    (2006.01)
    *F04D 29/40*    (2006.01)
    *F16H 57/04*    (2010.01)
    *F04B 17/03*    (2006.01)

(52) U.S. Cl.
    CPC .......... *F16H 57/0436* (2013.01); *F04B 17/03* (2013.01); *F04B 2205/11* (2013.01); *F04C 2240/30* (2013.01)

(58) Field of Classification Search
    CPC .......... F04B 2205/111; F04B 2205/112; F16H 57/0436; G01K 1/14; G01K 7/00; G01K 13/02; G01K 13/024; G01K 13/026; H02K 5/225; H02K 17/30
    See application file for complete search history.

(56) References Cited

U.S. PATENT DOCUMENTS

2016/0377082 A1* 12/2016 Fecke .................. H02K 5/12
                                                                 417/420
2018/0118528 A1*  5/2018 August ................. G05B 11/32

FOREIGN PATENT DOCUMENTS

| DE | 10 2005 002 363 B3 | 8/2006 |
| DE | 10 2005 009 644 B4 | 9/2013 |
| DE | 102012105534 A1 * | 1/2014 .............. G01K 1/20 |
| DE | 10 2013 017 975 A1 | 6/2015 |
| DE | 10 2016 114 540 A1 | 2/2018 |
| EP | 2 679 969 A2 | 1/2014 |

OTHER PUBLICATIONS

English Translation of DE-4435511 (Year: 1996).*
German Search Report issued Nov. 12, 2020 in German Application 10 2020 106 849.2 filed Mar. 12, 2020 (with English Translation of Categories of Cited Documents and Written Opinion), 6 pages.
Extended European Search Report issued Jul. 13, 2021 in corresponding European Patent Application No. 21160657.9, 7 pages.
Combined Chinese Office Action and Search Report issued May 11, 2023, in corresponding Chinese Patent Application No. 202110270602.9 (with English Translation of Category of Cited Documents) 8 pages.

* cited by examiner

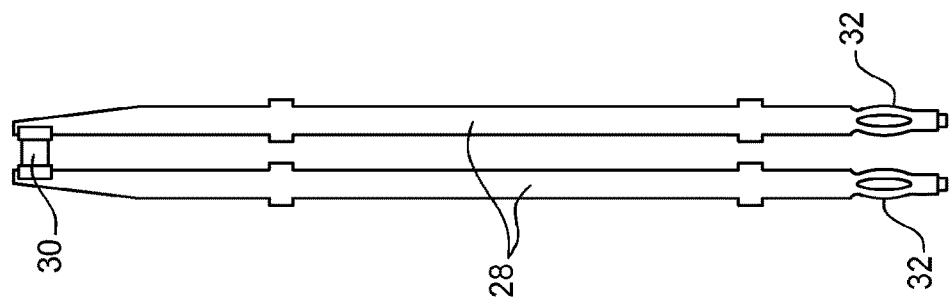
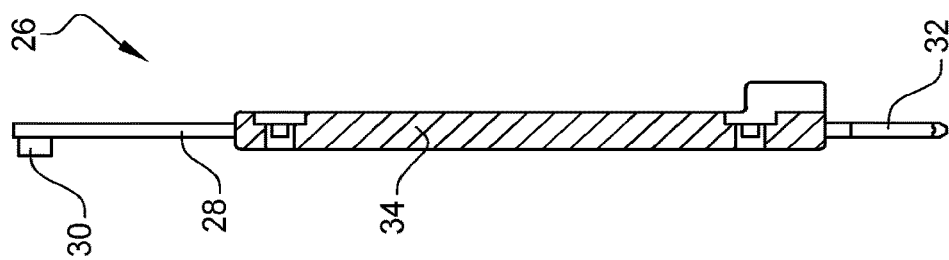
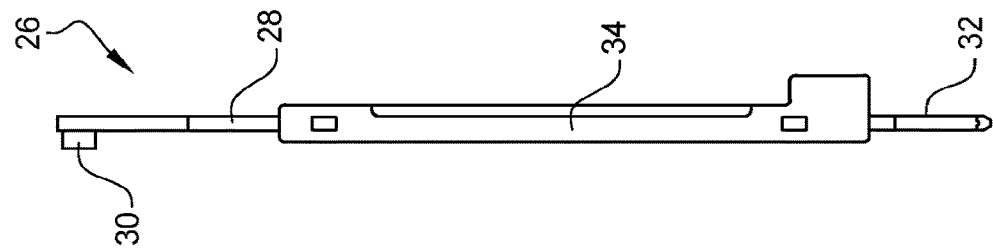
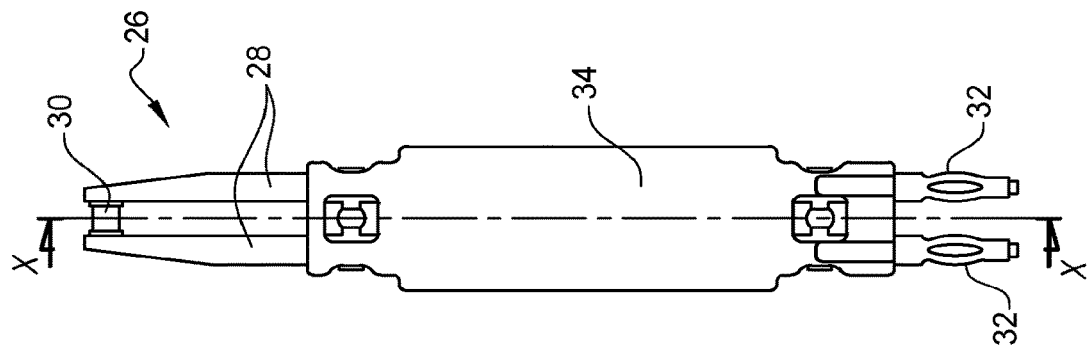

LIQUID PUMP, IN PARTICULAR FOR PROVIDING A SUPPLY TO A TRANSMISSION OF AN ELECTRIC OR HYBRID DRIVE MODULE OF A MOTOR VEHICLE

BACKGROUND OF THE INVENTION

Field of the Invention

The invention relates to a liquid pump, in particular for providing a supply to a transmission of an electric or hybrid drive module of a motor vehicle, having a pump housing in which a pump chamber and a pump rotor are arranged, wherein the pump chamber is connected to an outlet channel to which a temperature sensor is assigned.

Description of the Related Art

Such a liquid pump may be used for supplying oil to a transmission or other components in a drive train. DE 10 2013 017 975 A1 presents an example of such a liquid pump, wherein here, the pump rotor is formed in one piece with a rotor of an electric motor, which serves for driving the rotor.

Such liquid pumps may also have other types of rotors. For example, the pump rotor may be part of a toothed ring pump, which has an outer ring in which the pump rotor meshes. The outer ring, in turn, slides in the pump housing. This type of construction is also known as a gerotor pump.

With regard to control and regulation functions, it is advantageous to know the temperature of the hydraulic fluid which is delivered by the liquid pump. For this purpose, the temperature sensor is assigned to the outlet channel.

With regard to the temperature sensor, some conflicting requirements have to be met. Firstly, the temperature sensor is to be fittable without great outlay. Secondly, it is to be arranged in such a way that changes in the temperature of the hydraulic fluid can be detected as far as possible without delay by the temperature sensor. Finally, there must be no occurrence of leakage in the outlet channel in the region of the temperature sensor.

In the case of the liquid pump from the aforementioned DE 10 2013 017 975 A1, the temperature sensor projects into a protuberance of a control housing, which protuberance in turn projects into the outlet channel. The temperature sensor itself has a sensor element which, by means of conductor wires, is attached to contact elements. In order to achieve a connection to the wall of the control housing that has good heat conduction, a heat-conducting paste must be introduced. Overall, this results in a high production outlay.

BRIEF SUMMARY OF THE INVENTION

The object of the invention is to further develop a liquid pump of the type mentioned in the introduction to the extent that the requirements outlined above are met with the least possible outlay.

For the purpose of achieving said object, it is provided according to the invention, in the case of a liquid pump of the type mentioned in the introduction, that the temperature sensor has a lead frame and an SMD sensor element. The invention is based on the realization that, by way of an SMD sensor element, that is to say a sensor element which is connected to the lead frame using surface soldering technology, an altogether mechanically more stable temperature sensor can be obtained. This leads to various advantages for assembly, since an inherently stable unit which can be suitably processed further and fitted in the liquid pump is obtained.

According to one configuration of the invention, it is provided that the lead frame is provided on the side facing away from the SMD sensor element with two press-in contacts, which are pressed into openings in a circuit board. The press-in contacts make it possible for the temperature sensor to be pre-fitted on the circuit board such that, when the circuit board is attached to the liquid pump, the temperature sensor is automatically positioned correctly.

According to one configuration of the invention, it is provided here that the circuit board carries the control electronics of the liquid pump. Accordingly, only a single circuit board is required to fit all the electronic components of the liquid pump.

The lead frame may have a plastic bridge between the SMD sensor element and the press-in contacts. Said plastic bridge mechanically fixes the press-in contacts at the desired distance from one another, with the result that the two press-in contacts can be pressed into the openings, assigned thereto, in the circuit board using a machine with little outlay.

The SMD sensor element may have a plastic encapsulation, so that the actual sensor element is reliably protected from damage.

The plastic encapsulation of the SMD sensor element may extend to just before the press-in contacts, so that no separate plastic bridge is required.

According to one embodiment of the invention, the plastic encapsulation has a sealing flange which bears sealingly against the pump housing. This configuration makes it possible for the SMD sensor element to be arranged in the interior of the outlet channel and at the same time for the plastic encapsulation of the sensor element to be used for sealing.

Here, the sealing flange may have a groove in which an O-ring seal is arranged, in order to ensure reliable sealing with few components.

The sealing flange may be clamped between the pump housing and a control housing, such that, during the assembly of the pump (and in particular during the fitting of the control housing on the pump housing), the required pressing force, and thus the desired sealing action, is generated.

As an alternative to a groove for an O-ring, it is also possible for provision to be made of a groove in the encapsulation of the temperature sensor, which groove generates radial elasticity which is sufficient for the plate-like collar of the encapsulation to be pressed with an oversize into a recess of the control housing. This generates the necessary and sufficient sealing for allowing the temperature sensor to be potted in the control housing.

According to an alternative embodiment, provision is made of a control housing which is attached to the pump housing, wherein the control housing is provided with a protuberance which projects into the outlet channel, wherein the SMD sensor element is arranged within the protuberance. In said embodiment, the control housing is completely closed with respect to the outlet channel, with the result that no separate sealing is required.

It may be provided that the control housing, including the protuberance, is filled with a potting material. The latter then provides for the desired good heat transfer from the protuberance to the SMD sensor element.

The pump housing may have an opening for the protuberance, the inner diameter of which opening is larger than the outer diameter of the protuberance. For these geometrical conditions, it is ensured that the delivered hydraulic fluid flows around the protuberance completely, with the result that good heat transfer from the hydraulic fluid to the SMD sensor element is ensured.

BRIEF DESCRIPTION OF THE SEVERAL VIEWS OF THE DRAWINGS

The invention will be described below on the basis of various embodiments, which are illustrated in the appended drawings. In these drawings:

FIG. 8 shows a side view of the temperature sensor which is used in the liquid pump according to the second embodiment;

FIG. 9 shows a second side view of the temperature sensor in FIG. 8;

FIG. 10 shows a section along the plane X-X in FIG. 8;

FIG. 11 shows the components of the temperature sensor in FIGS. 8 to 10, before they are encapsulated with plastic.

DETAILED DESCRIPTION OF THE INVENTION

Figure 1:
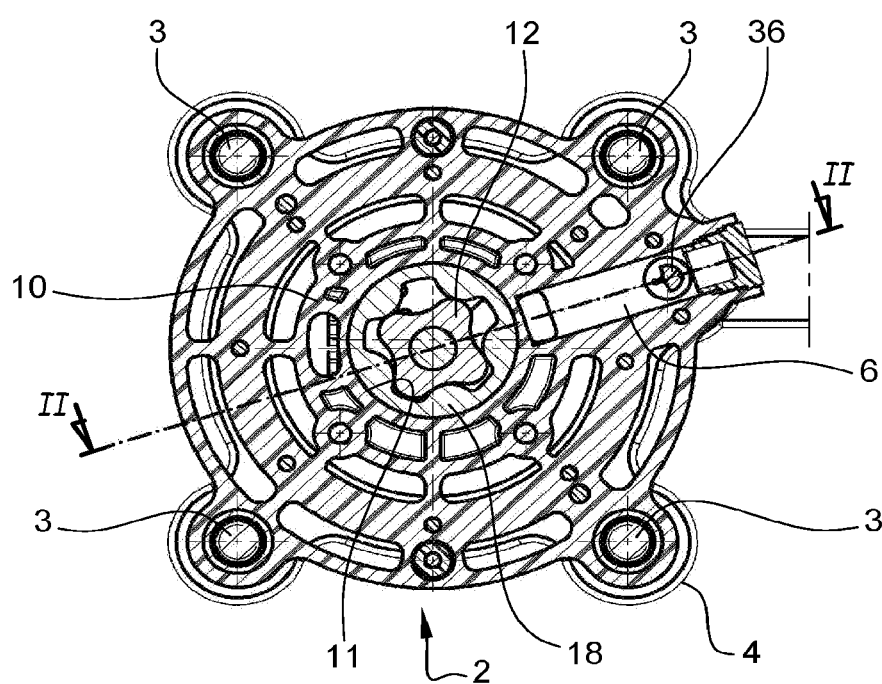
FIG. 1 shows a horizontal section along the plane I-I in FIG. 2 through a liquid pump according to a first embodiment of the invention.
Figure 2:
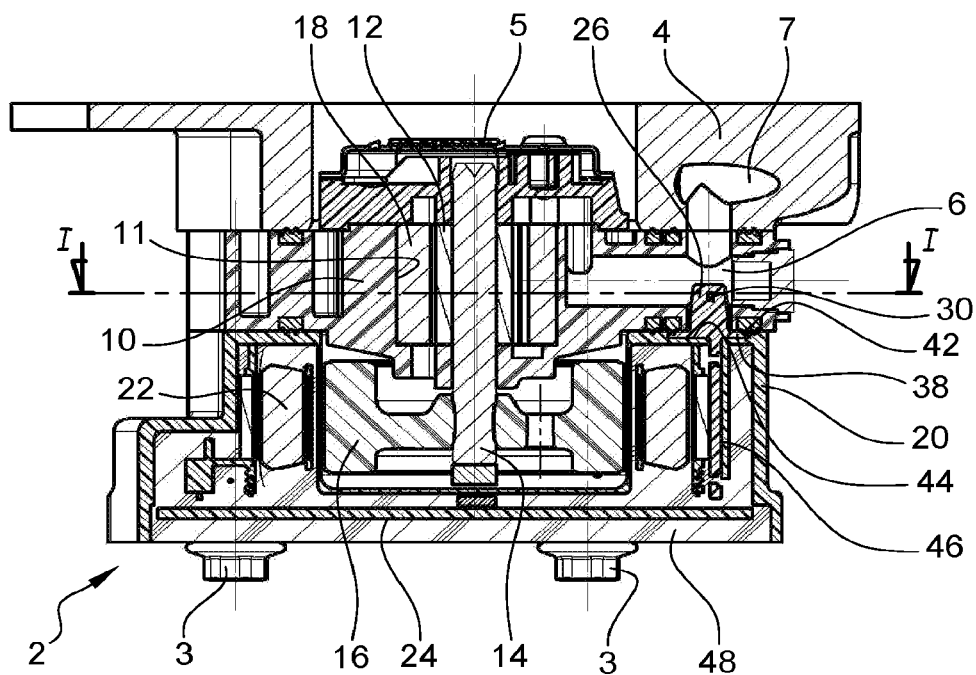
FIG. 2 shows a cross section along the plane II-II in FIG. 1.
Figure 6:
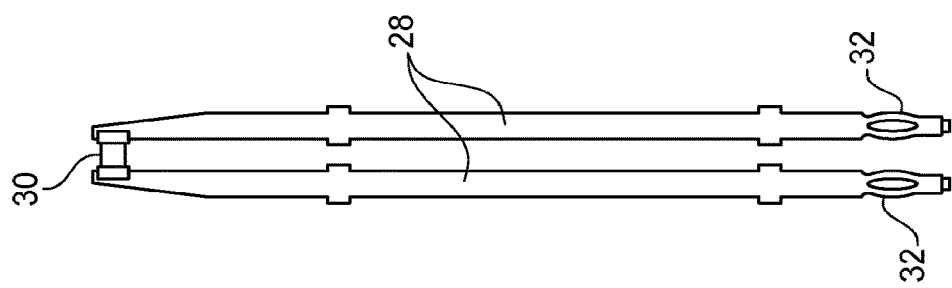
FIG. 6 shows the components of the temperature sensor in FIGS. 3 to 5, before they are encapsulated with plastic.
Figure 5:
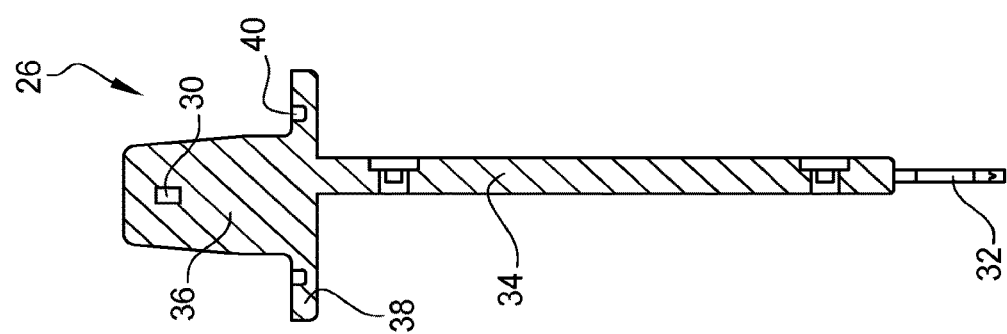
FIG. 5 shows a section along the plane V-V in FIG. 3.
Figure 4:
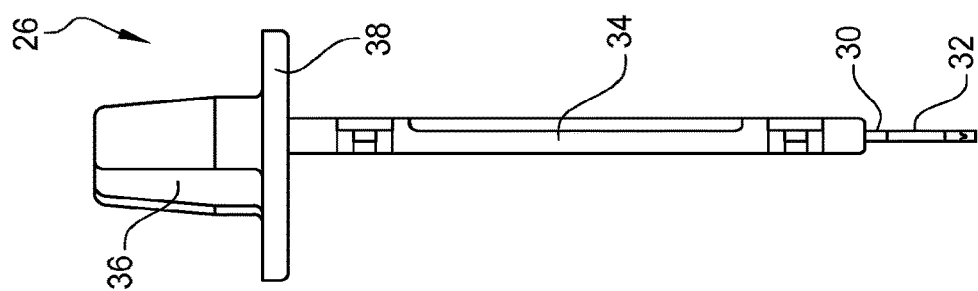
FIG. 4 shows a second side view of the temperature sensor.
Figure 3:
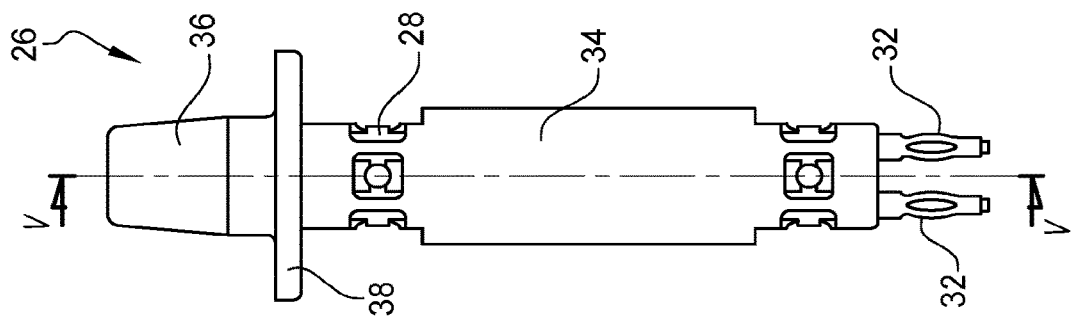
FIG. 3 shows a side view of a temperature sensor which is used in the liquid pump according to the first embodiment.
Figure 7:
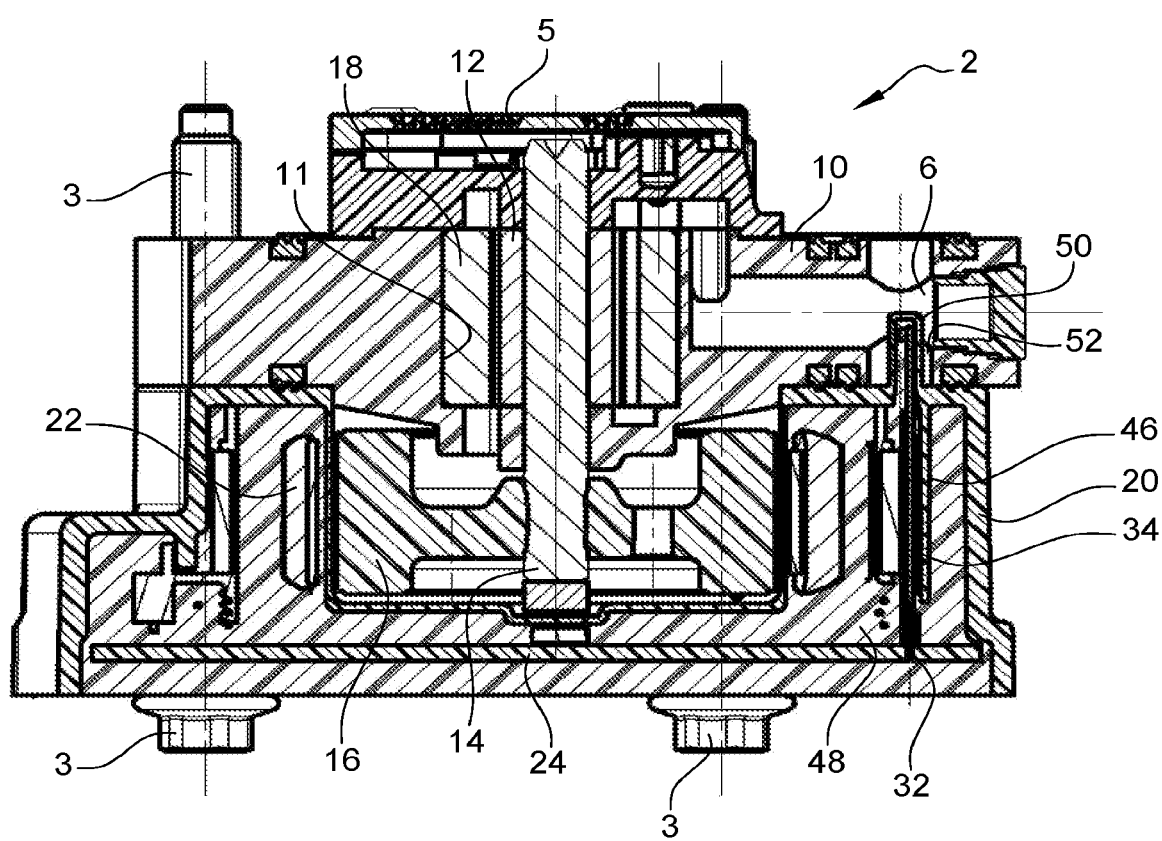
FIG. 7 shows a cross section through a liquid pump according to a second embodiment.

FIGS. 1 and 2 show a liquid pump 2 according to a first embodiment. It may serve for delivering hydraulic fluid which is supplied to a transmission of an electric or hybrid drive module of a motor vehicle, for example for lubrication of bearing points.

The liquid pump 2 may be attached to a transmission housing 4 for example by means of fastening screws 3 and directly suck hydraulic fluid from the transmission housing 4 through a filter 5. Said hydraulic fluid may then be removed via an outlet channel 6.

In the exemplary embodiment shown, the outlet channel 6 of the liquid pump 2 leads directly to a supply channel 7 which is integrated into the transmission housing 4. Alternatively, the liquid pump 2 could also have an outlet connector situated outside the transmission housing 4, in order to pass on the delivered hydraulic fluid through pipes or hoses.

The liquid pump 2 has a pump housing 10 with a pump chamber 11 in which a pump rotor 12 is arranged. The pump rotor 12 is coupled to a motor rotor 16 via a motor shaft 14.

In the embodiment shown, the pump rotor 12 meshes in an outer ring 18 which slides in the pump housing 10. Said liquid pump is therefore a toothed ring pump, also known as a "gerotor pump".

The specific configuration of the rotor is however of no further relevance here. Use could also be made of a rotor which functions according to the principle of a centrifugal pump.

A control housing 20 having inter alia a stator 22 and a circuit board 24 is attached to the pump housing 10.

Together with the motor rotor 16, the stator 22 forms the drive motor of the liquid pump.

The circuit board 24 carries various electronic components which serve for activation of the drive motor formed inter alia by the components 14, 22.

A temperature sensor 26 (see also FIGS. 3 to 6) is integrated into the liquid pump 2. Specifically, the temperature sensor 26 is assigned here to the outlet channel 6, so that the temperature of the hydraulic fluid on the pressure side of the liquid pump 2 can be detected.

The temperature sensor 26 has a lead frame 28, which is formed here by two conductor sections composed of metal that extend in a substantially parallel manner. An SMD sensor element 30 is attached to the lead frame 28 at one end. As can be seen in particular in FIG. 6, the SMD sensor element 30 is supported in a planar manner on the lead frame 28.

That end of the lead frame which is situated opposite the SMD sensor element 30 is in the form of two press-in contacts 32.

The temperature sensor 26 furthermore has a plastic encapsulation 34, which extends here from the region of the SMD sensor element 30 to just before the press-in contacts 32. As can be seen in particular in FIGS. 3 to 5, the plastic encapsulation 34 has a head-like section 36 which surrounds the SMD sensor element 30. In the direction towards the press-in contacts 32, the plastic encapsulation 34 is formed in the manner of a plastic bridge which fixes the two conductor sections of the lead frame 28 at a precise distance from one another.

A material having good heat conduction properties is used for the plastic encapsulation 34, so that the SMD sensor element 30 responds quickly to changes in the temperature on the outer side of the head-like section 36.

At the crossover from the head-like section 36 to the plastic bridge, the plastic encapsulation 34 has a sealing flange 38 which extends in a plane perpendicular to the longitudinal axis of the two conductor sections of the lead frame 28. A circumferential groove 40 intended for receiving an O-ring seal is provided on the side facing the SMD sensor element 30.

The temperature sensor 26 is fitted in the liquid pump 2 in such a way that the SMD sensor element 30 is situated within the outlet channel 6 (see FIGS. 1 and 2). For this purpose, the pump housing 10 has an opening through which the head-like section 36 extends. Here, the sealing flange 38 is clamped between the pump housing 10 and the control housing 20. An O-ring seal arranged in the groove 40 provides for liquid-tight sealing at this point.

As an alternative to an O-ring, use may also be made of moulded-on sealing lips.

The temperature sensor 26 is pressed, by way of its press-in contacts 32, into suitable openings in the circuit board 24 in such a way that the sealing flange 38 comes to bear on a support surface 44 of the control housing 20, which support surface faces the pump housing 10.

The control housing 20 may have an inwardly extending supporting wall 46 which guides the temperature sensor 26.

In the exemplary embodiment shown, the interior of the control housing 20 is filled with a potting compound 48 such that all the components (including the stator 22, the circuit board 24 and those sections of the temperature sensor 26 which extend into the control housing 20) are fixed rigidly therein.

FIGS. 7 to 10 show a second embodiment of the liquid pump. The same reference signs are used for the components known from the first embodiment, and, in this respect, reference is made to the explanations above.

The difference between the first and second embodiments is that, in the second embodiment, the control housing has a protuberance 50 which extends into the outlet channel 6 through an opening 52 in the pump housing 10. The temperature sensor 26, in particular the SMD sensor element 30, is arranged within the protuberance 50, so that the temperature sensor is separated by means of a (thin) wall of the control housing 20 from the outlet channel 6 and the hydraulic fluid situated therein.

As can be seen in FIGS. 8 to 10, for the temperature sensor according to the second embodiment, the plastic encapsulation 34 is formed only as a plastic bridge which fixes the two conductor elements of the lead frame 28 at a distance from one another and parallel to one another. The SMD sensor element 30 is exposed at the front end of the lead frame 28.

In the second embodiment too, the temperature sensor 26 is pressed into suitable openings in the circuit board 24. The supporting wall 46 serves for guidance. In the second embodiment too, the control housing 20 is completely filled with a potting compound 48 which conducts heat well. The potting compound 48 is situated even within the protuberance 50, with the result that the SMD sensor element 30 is separated thermally from the hydraulic fluid flowing through the outlet channel 6 only by the potting compound and the thin wall of the protuberance 50 of the control housing 20.

Since the protuberance 50 extends freely through the opening 52 of the pump housing 10, hydraulic fluid flows around the protuberance 50 on all sides, with the result that the SMD sensor element 30 can respond quickly to any changes in the temperature of the hydraulic fluid.

Figure 12:
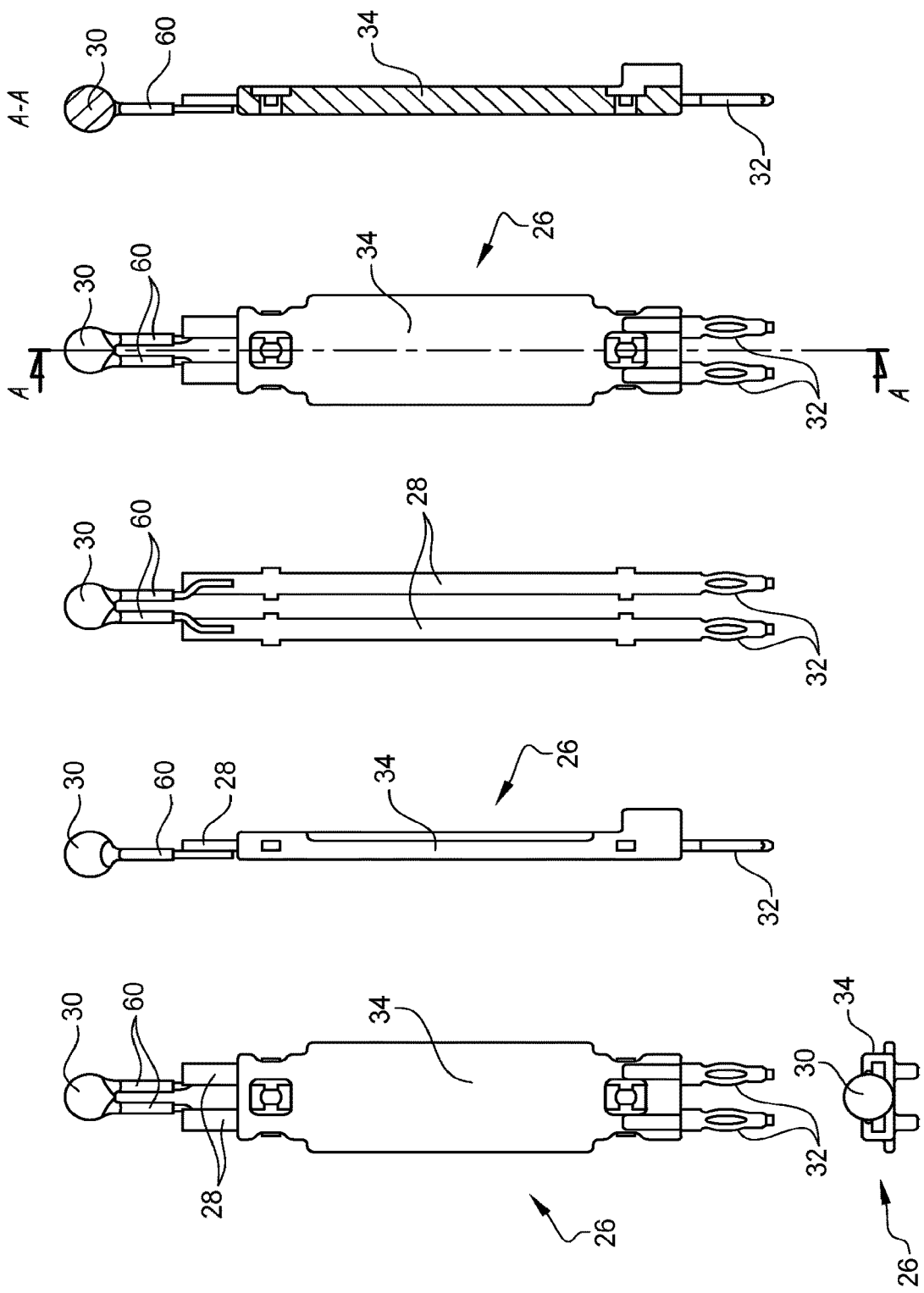
FIG. 12 shows, in various views, a temperature sensor according to a third embodiment.

FIG. 12 shows a temperature sensor according to a further embodiment. The same reference signs are used for the components known from the preceding embodiments, and, in this respect, reference is made to the explanations above.

The difference between the third embodiment and the preceding embodiments is that, in the third embodiment, the temperature sensor 30 is connected to the lead frame 28 via two contact wires 60. The contact wires 60 perform both the function of electrical connection of the temperature sensor 30 and the function of mechanical fixing of same until this is potted in the control housing in the same manner as the temperature sensor in the second embodiment.

The invention claimed is:

1. A liquid pump for providing a supply to a transmission of an electric or hybrid drive module of a motor vehicle, said liquid pump comprising:

a pump housing wherein a pump chamber and a pump rotor are arranged, wherein the pump chamber is connected to an outlet channel to which a temperature sensor is assigned, wherein the temperature sensor has a lead frame and a sensor element which is connected to the lead frame using surface soldering technology, wherein a control housing is attached to the pump housing, wherein the control housing is provided with a protuberance which projects into the outlet channel, wherein the control housing includes an inwardly extending supporting wall which guides the temperature sensor, the supporting wall being substantially parallel to the lead frame, wherein the sensor element is arranged within the protuberance such that the sensor element is separated by a wall of the protuberance of the control housing from the outlet channel and fluid flowing through the outlet channel, and wherein the control housing, including the protuberance, is filled with a potting compound so that the sensor element is separated thermally from the fluid flowing through the outlet channel only by the potting compound and the wall of the protuberance of the control housing.

2. The liquid pump according to claim 1, wherein the lead frame is provided on a side facing away from the sensor element with two press-in contacts, which are pressed into openings in a circuit board.

3. The liquid pump according to claim 2, wherein the circuit board carries control electronics of the liquid pump.

4. The liquid pump according to claim 1, wherein the lead frame has a plastic bridge between the sensor element and the press-in contacts.

5. The liquid pump according to claim 1, wherein the sensor element has a plastic encapsulation.

6. The liquid pump according to claim 5, wherein the plastic encapsulation of the sensor element extends to just before the press-in contacts.

7. The liquid pump according to claim 1, wherein the plastic encapsulation has a sealing flange which bears sealingly against the pump housing.

8. The liquid pump according to claim 7, wherein the sealing flange has a groove wherein an O-ring seal is arranged.

9. The liquid pump according to claim 7, wherein the sealing flange is clamped between the pump housing and a control housing.

10. The liquid pump according to claim 1, wherein the pump housing has an opening for the protuberance, an inner diameter of the opening is larger than an outer diameter of the protuberance.

\* \* \* \* \*